US 6,934,370 B1

(12) United States Patent
Leban et al.

(10) Patent No.: US 6,934,370 B1
(45) Date of Patent: Aug. 23, 2005

(54) SYSTEM AND METHOD FOR COMMUNICATING AUDIO DATA SIGNALS VIA AN AUDIO COMMUNICATIONS MEDIUM

(75) Inventors: Roy Leban, Redmond, WA (US); Ross Garrett Cutler, Duvall, WA (US); Henrique S. Malvar, Sammamish, WA (US); Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/462,243

(22) Filed: Jun. 16, 2003

(51) Int. Cl.[7] .............................................. H04M 11/00
(52) U.S. Cl. ................... 379/102.01; 704/273; 713/176
(58) Field of Search .................. 379/102.01–102.03, 379/102.06, 102.07; 704/273, 205; 382/100; 375/140; 341/52, 139; 713/193, 176; 380/253; 705/57, 58, 55; 709/204, 205; 348/14.08, 473, 469

(56) References Cited

U.S. PATENT DOCUMENTS

| | | | | |
|---|---|---|---|---|
| 5,319,735 A | * | 6/1994 | Preuss et al. ............... | 704/205 |
| 5,822,360 A | * | 10/1998 | Lee et al. .................... | 375/140 |
| 5,828,325 A | * | 10/1998 | Wolosewicz et al. ......... | 341/52 |
| 5,940,135 A | * | 8/1999 | Petrovic et al. ............. | 348/473 |
| 6,233,347 B1 | * | 5/2001 | Chen et al. .................. | 382/100 |
| 6,611,607 B1 | * | 8/2003 | Davis et al. ................ | 382/100 |
| 6,650,762 B2 | * | 11/2003 | Gibson et al. .............. | 382/100 |
| 6,737,957 B1 | * | 5/2004 | Petrovic et al. ............ | 340/5.86 |
| 6,738,744 B2 | * | 5/2004 | Kirovski et al. ............ | 704/273 |
| 6,751,337 B2 | * | 6/2004 | Tewfik et al. ............... | 382/100 |

OTHER PUBLICATIONS

International Telecommunication Union, "Series V: Data Communication Over The Telephone Network," Aug. 1996, 39 pgs.
IEEE Transactions on Signal Processing, "Spread–Spectrum Watermarking of Audio Signals" vol. 51, No. 4, Apr. 2003, 14 pgs.

* cited by examiner

*Primary Examiner*—Wing F. Chan
(74) *Attorney, Agent, or Firm*—Perkins Coie LLP

(57) ABSTRACT

A system for communicating audio data signals comprises a source computer that performs an action, generates an event message corresponding to the action, converts the event message into an audio data signal, and communicates the audio data signal through its speaker. A source telephone receives a voice signal from a participant and the audio data signal through its microphone and communicates the audio data signal and voice as coherent sound via an audio communications medium. A recipient telephone receives the audio data signal from the coherent sound communicated via the audio communications medium and communicates the audio data signal via its speaker. A recipient computer receives the audio data signal through its microphone, extracts the event message from the audio data signal, and performs an action based on the event message from the audio data signal. The audio communications medium can comprise a telephone communications system or air.

49 Claims, 10 Drawing Sheets

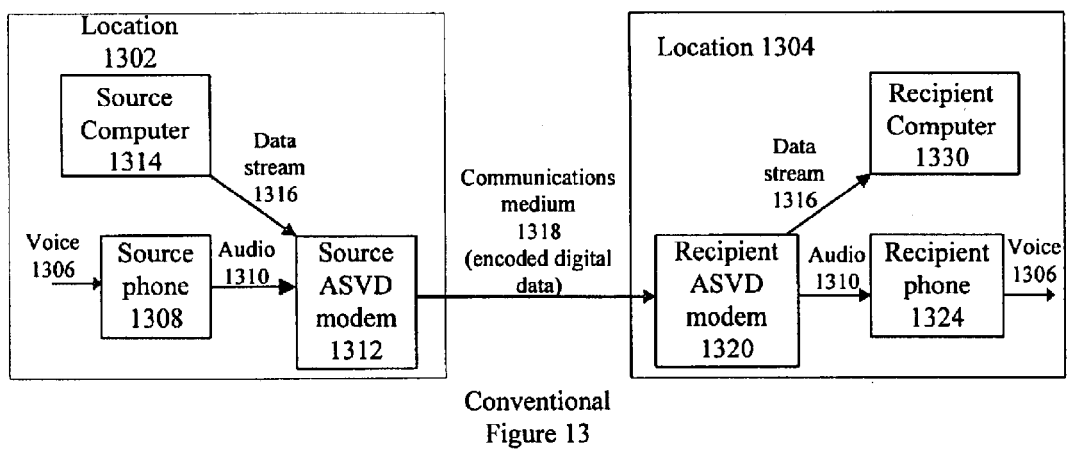
Conventional
Figure 13

SYSTEM AND METHOD FOR COMMUNICATING AUDIO DATA SIGNALS VIA AN AUDIO COMMUNICATIONS MEDIUM

FIELD OF THE INVENTION

The present invention relates to communicating audio signals between computer systems. Particularly, the present invention relates to communicating via an audio communications medium an audio data signal comprising data for performing an action.

BACKGROUND OF THE INVENTION

A number of conventional systems exist that use audio signals to transmit information. Conventional systems for transmitting audio signals include interactive voice response ("IVR") systems and systems that signal the beginning or end of content segments. Conventional IVR systems transmit a customer's menu selection to a computerized receptionist. For example, the IVR system provides the customer with an electronic menu to select a desired option. The customer presses a touchtone button to send a touchtone audio signal from the customer's telephone to the IVR system. The IVR system recognizes the touchtone as a specific menu selection. However, conventional IVR systems involve transmitting an audio signal between a person (the customer) and a computer (the IVR system). Accordingly, conventional IVR systems cannot transmit an audio signal between computers. Additionally, in a conventional IVR system, the customer transmits either voice or a touchtone. The customer cannot simultaneously transmit coherent voice and touchtones, because the touchtones mask or drown out the voice. Furthermore, the conventional touchtones have a pre-assigned meaning. The conventional IVR systems cannot communicate complex data. Those systems can only transmit the preset tones.

Conventional systems that use audio signals for the beginning or end of content segments typically comprise radio or television broadcasting systems or filmstrip systems. In a conventional radio or television broadcasting system, a broadcast entertainment content segment can include an audio signal that indicates the end of the entertainment content segment. A computer listens for the audio signal and broadcasts an advertising content segment when it recognizes the "end" audio signal of the entertainment content segment.

In a conventional filmstrip system, a filmstrip viewer device recognizes an audible beep on a cassette tape, which signals the end of the current slide and the correct time to advance the filmstrip. The filmstrip viewer device advances the filmstrip when it recognizes the audible beep.

The conventional systems for signaling the beginning or end of content segments include several deficiencies. For example, those conventional systems are closed systems. Those conventional systems do not communicate an audio signal to one or multiple other computer systems to cause those other systems to perform an action. Additionally, the conventional tones or beeps have a pre-assigned meaning. Accordingly, the conventional closed systems cannot communicate complex data. Those systems can only transmit the preset tones or beeps.

Another conventional system for transmitting voice and data is an ASVD (analog simultaneous voice and data) modem system. FIG. 13 is a block diagram depicting a conventional ASVD method for transmitting voice and data.

As shown in FIG. 13, the system 1300 can transmit voice and data between locations 1302, 1304. At location 1302, a meeting participant communicates voice 1306 to a source telephone 1308. The source telephone 1308 transmits an audio stream 1310 of the voice 1306 to a source ASVD modem 1312.

Simultaneously, a source computer 1314 generates a data stream 1316 and communicates the data stream 1316 to the source ASVD modem 1312. The source ASVD modem 1312 combines the data stream 1316 and the audio stream 1310, encodes the combined data in digital form, and communicates the encoded data through the communications medium 1318 to a recipient ASVD modem 1320 at location 1304.

The recipient ASVD modem 1320 decodes the digital data and splits the data stream 1316 from the audio stream 1310. The recipient ASVD modem 1320 transmits the audio 1310 to a recipient telephone 1324. The recipient telephone 1324 communicates the audio 1310 as the voice 1306 via its speaker. The recipient ASVD modem 1320 also communicates the data stream 1316 to the recipient computer 1330. The recipient computer 1330 interprets the data stream 1316 to evaluate the data.

However, the system 1300 requires that each participant at a separate location have the required ASVD modem hardware to interpret the encoded, digital data from the source location. The encoded, digital data communicated via the communications medium 1318 cannot be interpreted without a recipient ASVD modem 1320 to decode the received data. Accordingly, a participant communicating with other locations through only a telephone or the air as a communications medium cannot decode the encoded, digital data provided by the source ASVD modem. Additionally, the participant cannot hear the voice 1306 without the ASVD modem to decode the audio stream 1310.

Another method for transmitting voice and data comprises multiplexing. In multiplexing, a multiplexer combines a voice signal and a data signal into one signal and communicates the combined signal to a demultiplexer. The demultiplexer separates the voice signal and the data signal. However, the combined signal produced by the multiplexer does not comprise coherent sound and a demultiplexer is required to decipher the multiplexed signals. A person receiving the combined signal cannot understand the voice signal without first having a demultiplexer separate the voice and data signals.

Accordingly, there is need in the art for communicating audio data signals from a first computer system to a second computer system via an audio communications medium. A further need exists in the art for simultaneously communicating voice and audio data signals via a voice communication medium. Additionally, a need exists in the art for embedding data in the audio data signal for instructing the recipient computer to perform an action based on the data.

SUMMARY OF THE INVENTION

The present invention can provide a system and method for sending audio data signals between remote computers that are not directly connected through a network or other direct connection. A source computer can communicate the audio data signals over an audio communications medium to a recipient computer. The audio communications medium can comprise air, a telephone communications system. The audio data signals can comprise beeps, tones, spectrum modulation, audio watermarks, white noise, volume changes, or other suitable audio. Additionally, the audio data signals can comprise metadata that indicates to the recipient computer an event that occurred in the source computer. The audio data signal can comprise data for instructing the recipient computer to perform an action. For example, the action can comprise changing the displayed slide of a slide show presentation, displaying the name and/or location of a currently speaking meeting participant, displaying information for broadcast content, or displaying a static picture or video.

The present invention can make conferences and meetings more effective. For example, if participants conduct a conference-call meeting without computer-to-computer connections, the present invention can communicate audio data signals between computers over an existing voice medium, such as a telephone network. Accordingly, remote participants can enjoy an enhanced meeting experience by receiving data that can update slides of a slide show presentation, identify the currently speaking participant, generate pictures or video, or provide other meaningful data to the remote participant.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 13 is a block diagram depicting a conventional method for communicating voice and data.

DETAILED DESCRIPTION OF THE EXEMPLARY EMBODIMENTS

Figure 1:
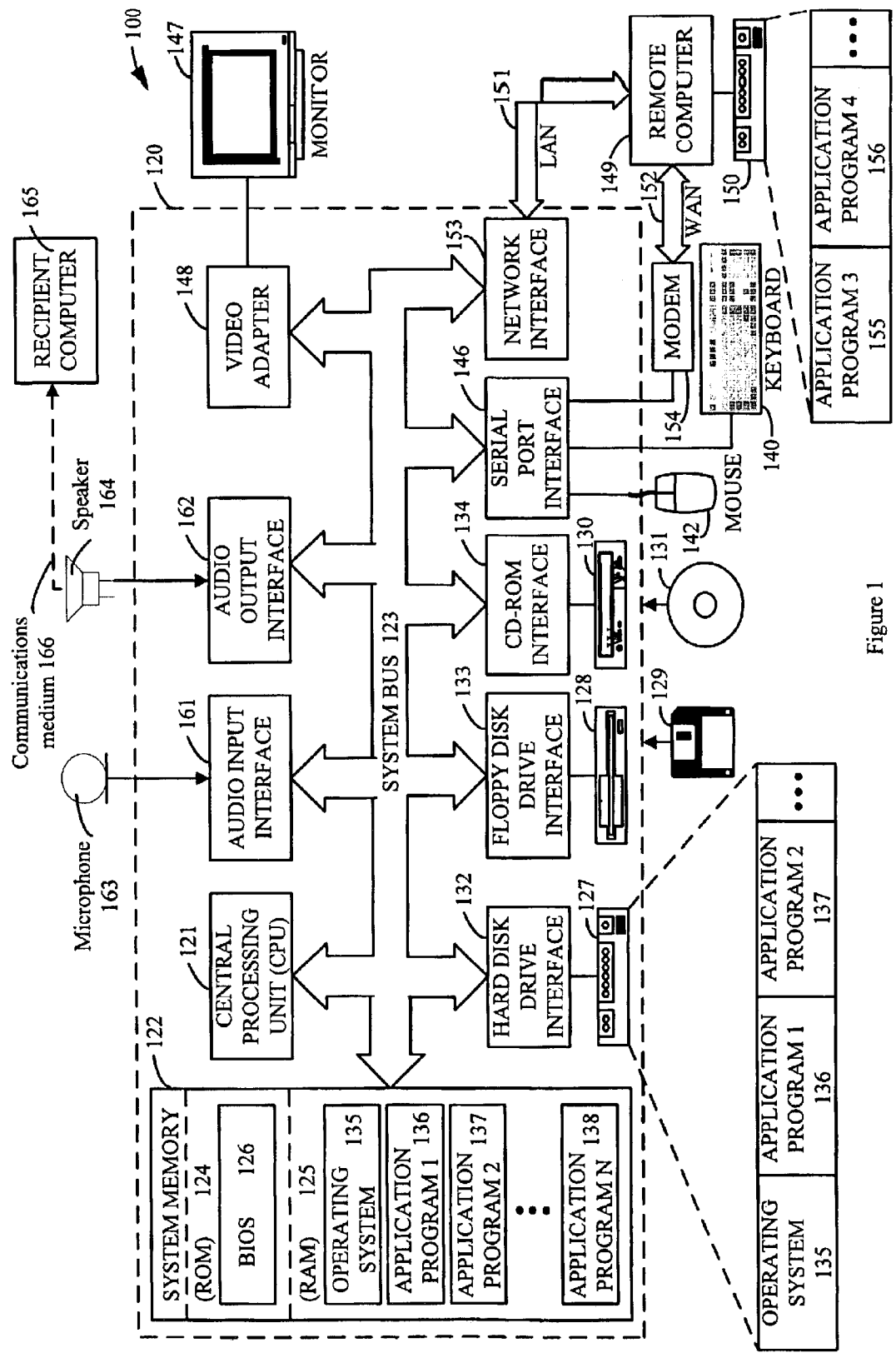
FIG. 1 is a block diagram depicting an exemplary operating environment for implementation of the present invention.

The present invention can provide a system and method for communicating data between computers that are not connected via a direct connection. The present invention can encode data from a source computer in an audio data signal. The source computer can communicate the audio data signal via the air, a telephone communications system, or other suitable communications medium. A recipient computer can receive the audio data signal, extract the data from the audio data signal, and perform an action based on the data. In an exemplary embodiment, the present invention can enhance meeting participation by allowing remote participants to receive data via a telephone, even though the remote participants are not connected to the data source via the Internet or other network.

Exemplary embodiments will be described generally in the context of software modules running in a computing environment. The processes and operations performed by the software modules include the manipulation of signals by a client or server and the maintenance of those signals within data structures resident in one or more of local or remote memory storage devices. Such data structures impose a physical organization upon the collection of data stored within a memory storage device and represent specific electrical or magnetic elements. Those symbolic representations are the means used by those skilled in the art of computer programming and computer construction to effectively convey teachings and discoveries to others skilled in the art.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text. Therefore, disclosure of a particular set of program code instructions is not considered necessary for an adequate understanding of how to make and use the invention. Furthermore, the invention can be implemented in computer hardware the performs the inventive functionality. The inventive functionality of the claimed computer program and hardware will be explained in more detail in the following description read in conjunction with the figures illustrating the program flow.

Referring now to the drawings, in which like numerals represent like elements, aspects of the present invention and exemplary operating environment will be described.

FIG. 1 is a block diagram depicting an exemplary operating environment 100 for implementation of the present invention. The exemplary operating environment 100 comprises a general-purpose computing device in the form of a conventional personal computer 120. Generally, the personal computer 120 comprises a central processing unit 121, a system memory 122, and a system bus 123. The system bus couples various system components including the system memory 122 to the processing unit 121. The system bus 123 can comprise any of several types of bus structures. For example, the system bus can comprise a memory bus or memory controller, a peripheral bus, or a local bus using any of a variety of bus architectures. The system memory 122 comprises a read-only memory (ROM) 124 and a random access memory (RAM) 125. The ROM 124 stores a basic input/output system (BIOS) 126. The BIOS 126 comprises the basic routines for transferring information between elements within the personal computer 120. For example, the BIOS 126 comprises the basic routines for start-up of the personal computer.

The personal computer 120 further comprises a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM or other optical media. The hard disk drive 127, magnetic disk drive 128, and optical disk drive 130 are coupled to the system bus 123 by a hard disk drive interface 132, a magnetic disk drive interface 133, and an optical disk drive interface 134, respectively. Although the exemplary operating environment 100 employs a ROM 124, a RAM 125, a hard disk drive 127, a removable magnetic disk 129, and a removable optical disk 131, those skilled in the art appreciate that other types of computer readable media which can store data accessible by a computer also can be used in the exemplary operating environment 100. For example, other media comprise magnetic cassettes, flash memory cards, digital video disks, Bernoulli cartridges, and the like. The drives and their associated computer readable media can provide nonvolatile storage of computer-executable instructions, data structures, program modules, and other data for the personal computer 120.

The ROM 124, RAM 125, hard disk drive 127, magnetic disk 129, or optical disk 131 can store a number of program modules. For example, the program modules can comprise an operating system 135 and various application programs 136–138. Program modules comprise routines, sub-routines, programs, objects, components, data structures, etc., which perform particular tasks or implement particular abstract data types.

A user can enter commands and information into the personal computer 120 through input devices. The input devices can comprise a keyboard 140 and a pointing device 142. The pointing device 142 can comprise a mouse, a trackball, or an electronic pen that can be used in conjunction with an electronic tablet. Other input devices (not shown) can comprise a joystick, game pad, satellite dish, scanner, or the like. Those and other input devices can be coupled to the processing unit 121 through a serial port interface 146 coupled to the system bus 123. The input devices also can be coupled to the system bus 123 by other interfaces. Other interfaces can comprise a parallel port, game port, a universal serial bus (USB), or the like. Additionally, the input devices also can comprise a microphone 163 coupled to the system bus 123 by an audio input interface 161.

A display device 147 also can be coupled to the system bus 123 via an interface, such as a video adapter 148. The display device 147 can comprise a monitor. In addition to the display device 147, the personal computer 120 can comprise other peripheral output devices. The other peripheral output devices can comprise a printer (not shown). Additionally, the other peripheral output devices can comprise a speaker 164 coupled to the system bus 123 via an audio output interface 162.

The personal computer 120 can operate in a networked environment using logical connections to one or more remote computers 149. The remote computer 149 can comprise another personal computer, a server, a client, a router, a network PC, a peer device, or other common network node. While the remote computer 149 typically comprises many or all of the elements described above relative to the personal computer 120, only a memory storage device 150 has been illustrated in FIG. 1 for simplicity. The logical connections depicted in FIG. 1 comprise a local area network (LAN) 151 and a wide area network (WAN) 152. Such networking environments are commonplace in offices, enterprise-wide computer networks, intranets, and the Internet.

When used in a local area networking environment, the personal computer 120 typically is coupled to the LAN 151 through a network interface or adapter 153. When used in a wide area networking environment, the personal computer 120 typically comprises a modem 154 or other means for establishing communications over the WAN 152. The modem 154 can comprise an internal or external modem and can be coupled to the system bus 123 via the serial port interface 146. In a networked environment, the remote memory storage device 150 can store the program modules depicted for the personal computer 120, or portions thereof. Those skilled in the art appreciate that the network connections shown are exemplary and that other means of establishing a communications link between computers can be used.

According to an exemplary embodiment of the present invention, the personal computer 120 also can be coupled to a recipient computer 165 via a communications medium 166. The personal computer 120 can communicate audio data signals via the speaker 164 for communication to the recipient computer 165 via the communications medium 166. The recipient computer 165 can extract data from the audio data signal and can perform an action based on the data in the audio data signal.

Those skilled in the art will appreciate that the present invention can be implemented in other computer system configurations. For example, other computer system configurations comprise hand-held devices, multiprocessor systems, microprocessor based or programmable consumer electronics, network personal computers, minicomputers, mainframe computers, and the like. The invention also can be practiced in distributed computing environments in which tasks are performed by remote processing devices linked through a communications network. In a distributed computing environment, the program modules can be located in both local and remote memory storage devices.

Figure 2:
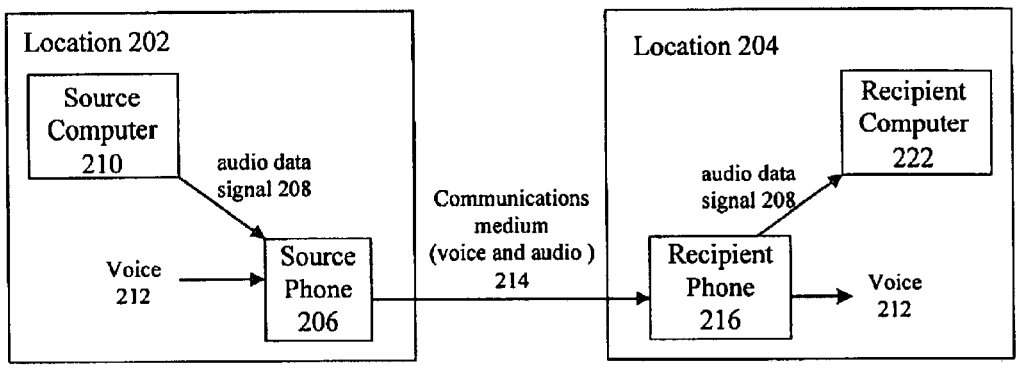
FIG. 2 is block diagram depicting a system for communicating audio data signals via a communications medium according to an exemplary embodiment of the present invention.

FIG. 2 is block diagram depicting a system 200 for communicating audio data signals via a communications medium according to an exemplary embodiment of the present invention. As illustrated in FIG. 2, the system 200 communicates audio data signals between locations 202, 204. For voice communications, a meeting participant at location 202 communicates a voice signal 212. A source telephone 206 receives the voice 212 and communicates the voice 212 via the communications medium 214 to a recipient telephone 216 at location 204. At location 204, the recipient telephone 216 communicates the received voice 212 via its speaker.

In an exemplary embodiment, the communications medium 214 can comprise an audio communications medium such as a telephone communications system. For example, the communications medium 214 can comprise an analog telephone connection, a digital telephone connection, a wireless telephone connection, combination telephone connections, or other telephone communications system for communicating between telephones 206, 216. Accordingly, the system 200 does not require special hardware to participate in a meeting and to receive the voice 212. Conventional telephones can communicate the voice 212.

The system 200 also can communicate audio data signals between locations 202, 204 via the communications medium 214. The audio data signals can comprise an event message indicating to a recipient computer the occurrence of an action on a source computer. At location 202, a source computer 210 performs an action and determines whether to communicate an event message indicating the performance of the action. If yes, then the source computer generates the event message, encodes the event message in an audio data signal 208, and communicates the audio data signal 208 via its speaker. The source telephone 206 receives the audio data signal 208 through its microphone and communicates the audio data signal 208 via the communications medium 214 to the recipient telephone 216 at location 204. At location 204, the recipient telephone 216 communicates the received audio data signal 208 via its speaker. A recipient computer 222 receives the audio data signal 208 through its microphone, extracts the digital data of the event message from the audio data signal, and performs an action corresponding to the event message.

As discussed above, the communications medium 214 can comprise an audio communications medium such as a telephone communications system. Accordingly, a remote meeting participant does not require special hardware to participant in the meeting. Additionally, the system 200 communicates the audio data signal 208 via the communications medium 214. The remote meeting participant also does not require special hardware to receive the audio data signal 208.

Any person can participate in the meeting if he has access to a telephone. The system 200 can communicate simultaneously the voice 212 and the audio data signal 208 via the communications medium 214. Additionally, the system 200 communicates coherent voice 212 and audio data signal 208. Accordingly, the meeting participant hears the coherent voice 212 and the audio data signal 208. If the meeting participant has access to a recipient computer 222, then the meeting participant can enjoy an enhanced meeting through the actions performed by the recipient computer 222 in response to the data in the audio data signal 208.

In another exemplary embodiment, the audio data signal 208 can comprise a signal that is not audible to the human ear, such as a low-level, spread-spectrum audio watermarking signal having a presence masked by the voice signal. In that case, the remote meeting participant hears only the voice 212. If the meeting participant has access to a recipient computer 222, then the meeting participant can enjoy an enhanced meeting through the actions performed by the recipient computer 222 in response to the instructions in the inaudible audio data signal 208. Throughout this specification, an "audio data signal" refers to both human-audible and human-inaudible audio data signals.

In exemplary embodiments, the audio data signal 208 can comprise a beep, tone, spectrum modulation, volume modulation, an analog or digital watermark, a combination of audio signals, or other audio signals. Additionally, the audio data signal 208 can comprise white noise that comprises the data corresponding to the event message. Accordingly, meeting participants hear the white noise but may not hear the beeps or tones within the white noise. In one exemplary embodiment, the audio data signal 208 can comprise preset data. In another exemplary embodiment, the audio data signal 208 can comprise metadata or other complex data that communicates information from the source computer 210 to the recipient computer 222.

The audio data signal 208 can comprise data corresponding to many different events. In an exemplary embodiment, the source computer 210 can communicate an audio data signal 208 to synchronize a slide show presentation displayed on the source computer 210 and the recipient computer 222. For example, when a presenter changes the slide displayed on the source computer 210 from slide 1 to slide 2, the source computer 210 identifies the changed slide as an action that requires notifying the recipient computer 222 to synchronize the slide show presentation. Accordingly, the source computer 210 generates an event message indicating that the presenter changed to slide 2, encodes the event message in an audio data signal 208, and communicates the audio data signal 208 via its speaker.

The source telephone 206 receives the audio data signal 208 through its microphone or a direct connection interface (for example, a microphone/headphone jack, or an analog or digital connector) and communicates the audio data signal 208 through the communications medium 214 to the recipient telephone 216 at the location 204. The recipient telephone 216 communicates the audio data signal 208 via its speaker at the location 204. A microphone on the recipient computer 202 receives the audio data signal 208 and extracts the event message from the audio data signal 208. Then, the recipient computer 222 updates the displayed slide based on the event message in the audio data signal 208. In another exemplary embodiment, the recipient computer 222 also can receive the audio data signal 208 from the telephone 216 via a direct connection (for example, a microphone/headphone jack, or an analog or digital connector).

In an exemplary embodiment, the recipient computer 222 can be configured to perform different actions based on the event message. For example, in the slide show example discussed above, the recipient computer can change the displayed slide 1 to slide 2 based on the event message indicating that the presenter changed the slide. Alternatively, the recipient computer 222 can be configured to highlight the currently displayed slide 2 in a list of available slides. In that case, the operator of the recipient computer 222 can determine when to change the displayed slide.

In another exemplary embodiment, the source computer 210 can communicate data for synchronizing the source computer 210 and the recipient computer 222. For example, when the operator of the source computer 210 initiates recording of a conversation, deposition, or other sound, the source computer 210 can communicate an audio data signal that initiates recording in the recipient computer 222.

The exemplary system 200 of FIG. 2 illustrates one-way communications flow for simplicity. However, the system 200 can provide two-way communications between locations 202, 204 and each computer 210, 222 can function as either a source computer 210 or a recipient computer 222. Additionally, any number of locations can be coupled together via the communications medium 214 an can receive the audio data signal from the source computer 210.

Figure 3:
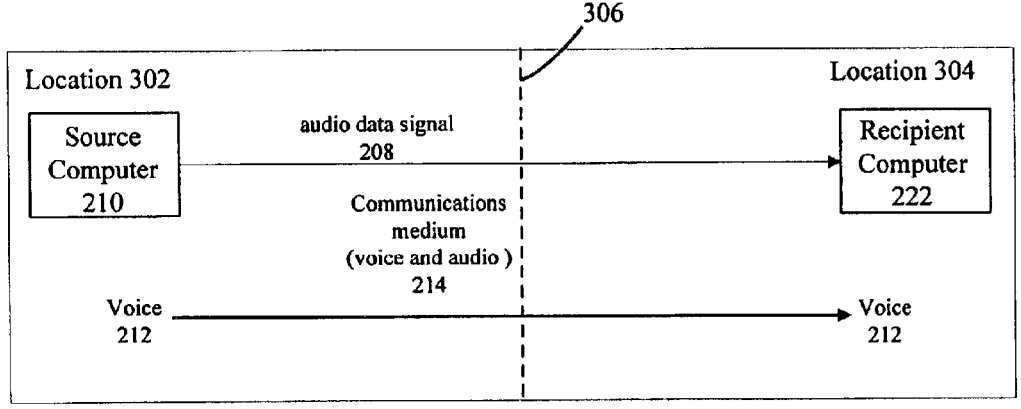
FIG. 3 is a block diagram depicting a system for communicating audio data signals via a communications medium according to another exemplary embodiment of the present invention.

FIG. 3 is a block diagram depicting a system 300 for communicating audio data signals via a communications medium according to an alternative exemplary embodiment of the present invention. As shown in FIG. 3, the system 300 can communicate audio data signals between locations 302, 304. As illustrated by the dashed line in FIG. 3, the locations 302, 304 can be in the same room or within a distance that allows communication of audible sounds between computers. The source computer 210 communicates the audio data signal 208 via its speaker. The microphone of the recipient computer 222 receives the audio data signal 208, extracts data from the audio data signal 208, and performs an action based on the data.

In an exemplary embodiment, the audio data signals communicated by the system 300 can be contained within a single room. Accordingly, those signals are not communicated outside of the room to interfere with other computer systems. That operation is in contrast to data signals communicated via conventional frequencies that carry from room to room and through walls and buildings.

In an exemplary embodiment, the system 300 can update the displayed slide of a slide show presentation for each recipient computer 222 located within computer-audible range of the source computer 210. For example, the source computer 210 can display a slide show presentation being provided in an auditorium. When the presenter changes the slide on the source computer from slide 1 to slide 2, the audio data signal 208 can instruct a recipient computer 222 to update the displayed slide to slide 2.

In an exemplary embodiment, the recipient computer 222 can comprise a handheld-type computer. Accordingly, an audience member can view the slide show presentation on the handheld-type recipient computer 222 and the audio data signal can comprise instructions to update the currently displayed slide on the handheld-type computer.

In an alternative exemplary embodiment, the source computer 210 can communicate an audio data signal 208 that provides the actual slides of the slide show presentation. The recipient computer 222 can receive the audio data signal 208 and can display the current slide on the recipient computer 222. The meeting participant can view the slides on the recipient computer 222 and can take notes on or change each slide.

In another exemplary embodiment, the communications medium 214 can comprise a broadcast network. A radio or television station can broadcast an audio data signal from the source computer 210 to a listener/viewer at the recipient location 304. A radio or television (not shown) at the recipient location can communicate the audio data signal 208 to the recipient computer 222. The recipient computer 222 can receive the audio data signal 208 and can display information about the broadcast. For example, the audio data signal can comprise metadata indicating the singer and song title of the currently playing song on a radio station. The broadcast station can communicate the audio data signal to all of its listeners/viewers. Those listeners/viewers with a recipient computer can enjoy an enhanced experience by receiving the data in the audio data signal.

In the broadcast example discussed above, the recipient computer 222 can be a stand alone computer that receives the audio data signal communicated from the radio or television. Alternatively, the recipient computer 222 can be integrated into the radio or television. In that case, the recipient computer 222 comprises a source communications device discussed in detail below with reference to FIGS. 4 and 6.

Figure 4:
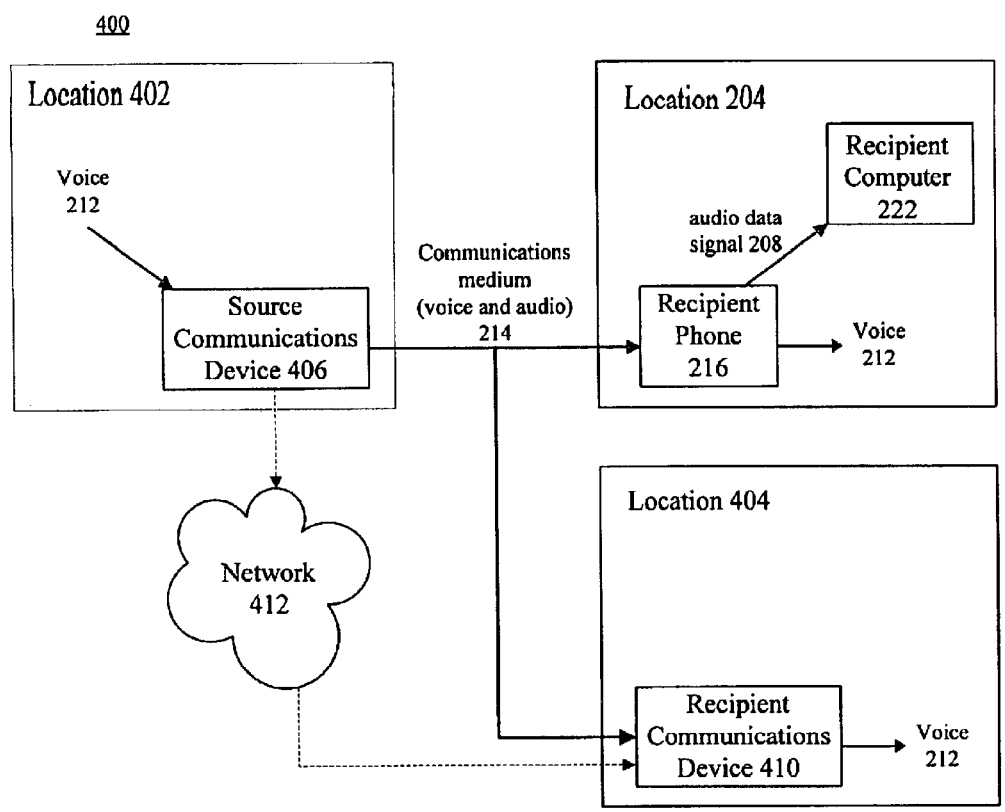
FIG. 4 is a block diagram depicting a system for communicating audio data signals via a communications medium according to another exemplary embodiment of the present invention.

FIG. 4 is a block diagram depicting a system 400 for communicating audio data signals via a communications medium according to another exemplary embodiment of the present invention. As illustrated in FIG. 4, the system 400 can communicate audio data signals between locations 402, 404, and 204. In the system 400, the source computer at location 402 comprises a source communications device 406. Additionally, the recipient computer at location 404 comprises a recipient communications device 410. Each communications device 406, 410 comprises components for communicating an audio data signal. Additionally, each communications device 406, 410 can comprise communications components, such as a telephone or broadcast equipment. The system components at location 204 comprise the components discussed above with reference to FIG. 2.

For voice communications, the source communications device 406 at location 402 receives the voice signal 212 and communicates the voice 212 via the communications medium 214 to the recipient telephone 216 at location 204. The recipient telephone 216 communicates the voice 212 at location 204 through its speaker.

The source communications device 406 also encodes an event message in an audio data signal 208, indicating to the recipient computer 222 the occurrence of an action. The source communications device 406 communicates the audio data signal 208 via the communications medium 214 to the recipient telephone 216 at location 204. At location 204, the recipient telephone 216 communicates the audio data signal 208 via its speaker. The recipient computer 222 receives the audio data signal 208 through its microphone, extracts the event message from the audio data signal 208, and performs an action corresponding to the event message.

The source communications device 406 also can communicate the voice 212 and the audio data signal 208 via the communications medium 214 to the recipient communications device 410 at location 404. The recipient communications device 410 receives the voice 212 and communicates the voice 212 via its speaker. The recipient communications device 410 also receives the audio data signal 208, extracts the data of the event message from the audio data signal 208, and performs an action corresponding to the event message.

As illustrated in FIG. 4, any person can participate in a meeting if he has access to a telephone 216 or a recipient communications device 410 comprising a telephone. The system 400 can communicate simultaneously the voice 212 and the audio data signal 208. Each meeting participant hears the voice 212. If the meeting participant has access to a recipient computer 222, 410, then the meeting participant can enjoy an enhanced meeting through the actions performed by the recipient computer 222, 410 based on the event message in the audio data signal 208.

FIG. 4 also illustrates that the source computer (source communications device 406) can communicate with the recipient communications device 410 via the network 412. The network can comprise the internet or a local area network. In that case, the recipient computer 410 does not rely on the audio data signal 208 to provide the enhanced meeting.

In an exemplary embodiment, the source communications device 406 can comprise a telephone and a data generator. The data generator can produce audio data signals for transmission to the locations 204, 404. For example, the source communications device 406 can comprise a telephone and a 360-degree video camera with a microphone array providing directional identification of the currently speaking meeting participant. The array can detect the voice 212 at specific locations around its perimeter. The meeting participants can enter their name with their respective location around the array. When the array detects the voice 212 from a specific location, the data generator generates an audio data signal comprising an event message that indicates the name of the meeting participant producing the voice 212. Then, the source communications device 406 communicates the audio data signal 208 comprising the name through the communications medium 214 to the recipient telephone 216 at location 204 and the recipient communications device 410 at location 404.

At location 204, the recipient telephone 216 communicates the audio data signal 208 via its speaker. The microphone of the recipient computer 222 receives the audio data signal 208, extracts the event message from the audio data signal 208 to obtain the name, and performs the action of displaying the name of the person providing the voice 212. At location 404, the recipient communications device 410 also receives the audio data signal 208, extracts the event message from the audio data signal 208 to obtain the name, and performs the action of displaying the name of the person providing the voice 212. Accordingly, meeting participants at locations 204, 404 can receive information identifying the person providing the voice 212, even though the participant is not connected to the source communications device 406 via the network 412. The source communications device 406 also communicates the voice 212 as well as video to the recipient communications device 410 via the network 412. Accordingly, the meeting participant at location 404 can receive the complete voice and video provided by source communications device 406 via the network 412.

By way of another example, a remote participant can connect to a meeting room in which five other meeting participants communicate via a single phone with the remote participant. The phone can comprise a 360-degree video camera with a microphone array providing directional identification of the currently speaking meeting participant. Because the remote participant only has a telephone connection, he only receives the voice from the telephone video camera. With five participants in the source location, the remote participant may not be able to determine who is currently speaking. However, the microphone array does provide speaker location information (by using a sound source localization technique). At the beginning of the meeting, the remote participant launches an application program and asks the five other meeting participants where they sit in the room around the microphone array. The remote participant assigns five names (or pictures or face icons) to those locations in a virtual meeting room inside the application. During the meeting, the video camera/microphone array communicates to the remote person the voice and an audio data signal indicating the currently speaking participant location. The application program at the remote location can highlight the person's name/icon who is talking based on the location information. Accordingly, the remote participant enjoys an enhanced meeting experience by receiving the data from the audio data signal. Even without assigning the participant names to their locations, the remote participant can enjoy a better experience. The application program can highlight the location of the sound source. Then, the remote participant can make an association with the highlighted location and the speaking participant.

In another exemplary embodiment, the audio data signal can comprise data for a static picture or video taken by a camera or video camera. Accordingly, the meeting participants at locations 204, 404 can view static pictures or video without a network connection to the video camera.

In an alternative exemplary embodiment, the audio data signal can comprise a slice of video taken by a camera or a video camera. For example, if the directional microphone detects a voice signal coming from a location represented at 100 degrees, then a slice of the 360 degree signal around 100 degrees (for example, 70 degrees to 130 degrees) can be communicated via the audio data signal. The remote participant can view a picture or video that appears as if the camera is aimed at the current speaker. Additionally, the video signal can be controlled to prevent the video from jumping if the current speaker changes rapidly.

In an alternative exemplary embodiment, the source communications device 406 can comprise a telephone having a 360-degree microphone providing directional identification of the currently speaking meeting participant. In that case, the system operates as described above for the 360-degree video camera except for the video communication via the network 412.

In another exemplary embodiment, the data generator of each source communications device can communicate an audio data signal identifying the respective source communications device currently communicating voice from a meeting participant. Additionally, each meeting participant can program his source communications device to associate his name with the respective source communications device at his location. Then, each source communications device can communicate an audio data signal comprising the currently speaking participant's name for display on each recipient computer. Accordingly, speaking participants can be identified by name or location even if many participants are included at different locations.

Figure 5:
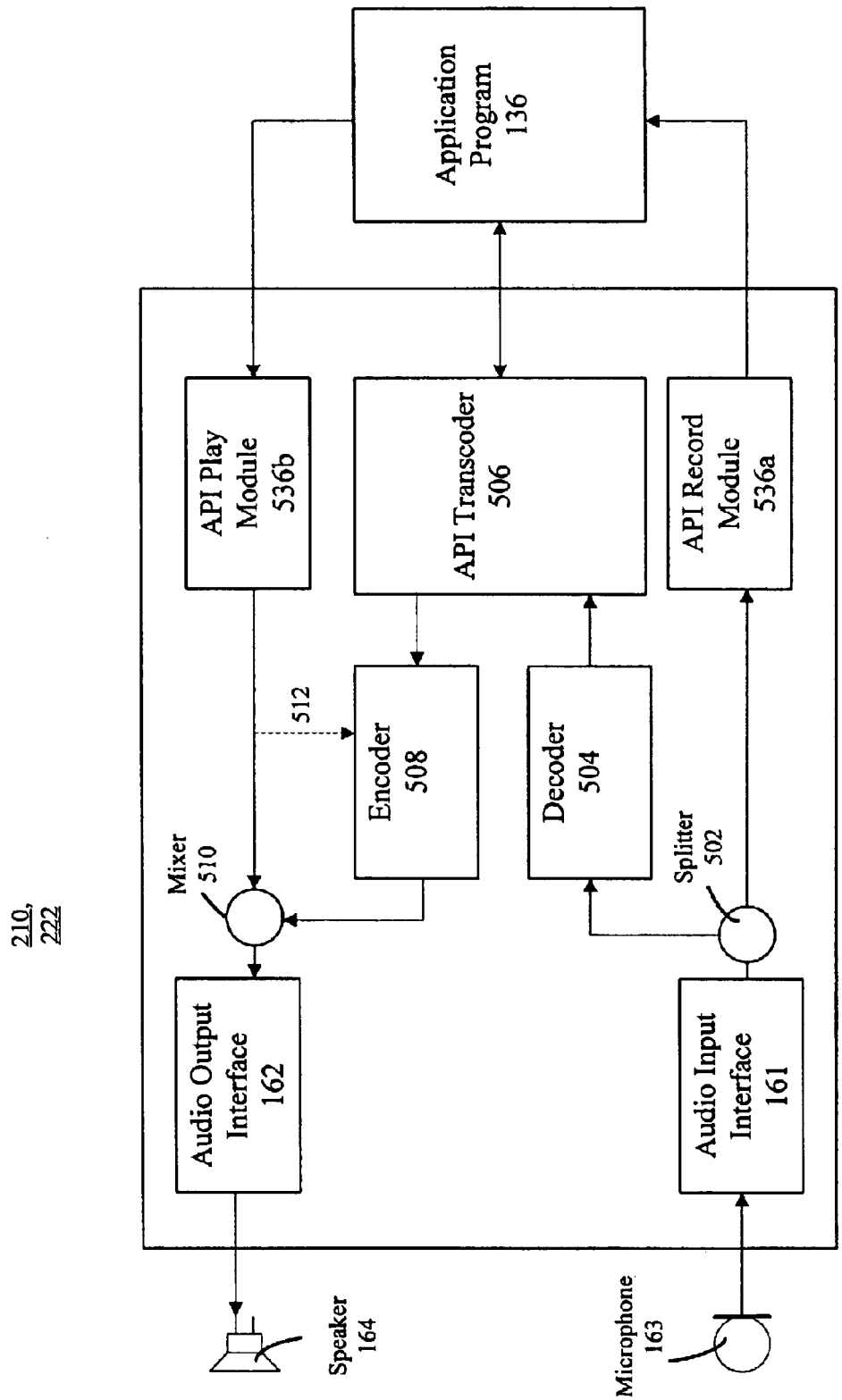
FIG. 5 is a block diagram depicting components of a source computer and a recipient computer according to an exemplary embodiment of the present invention.

FIG. 5 is a block diagram depicting components of the source computer 210 and the recipient computer 222 according to an exemplary embodiment of the present invention. As illustrated in FIG. 5, the source computer 210 and the recipient computer 222 can comprise components for two-way communication that allow both computers to send and receive audio data signals. The source and recipient computers 210, 222 comprise an application program 136. In the source computer 210, the application program 136 performs an action and communicates an event message to an application program interface ("API") transcoder 506. The transcoder 506 determines whether to notify the recipient computer 222 of the performed action. If not, then the transcoder 506 waits to receive another event message from the application program 136. If the transcoder 506 determines to notify the recipient computer 222 of the performed action, then the transcoder 506 communicates the event message to an encoder 508.

As indicated by the dashed line 512 in FIG. 5, the encoder 508 monitors audio output by the application program 136 through the API play module 536b. The encoder 508 monitors the application program's 136 output to determine the proper timing for overlaying an audio data signal with the application program's 136 audio. Additionally, some encoding algorithms operate by modifying input data. Accordingly, by monitoring the application program's 136 output, the encoder 508 can use any encoding method to encode the event message into an audio data signal. The encoder 508 can encode the event message through any suitable method.

The encoder 508 encodes the digital event message into an audio data signal. When appropriate, the encoder 508 communicates the audio data signal to a mixer 510. The mixer 510 overlays the audio data signal on the application program's 136 output through any suitable technique, such as spread spectrum modulation of phase, frequency, amplitude, volume, or other suitable method. The mixer 510 communicates the audio data signal and the application program's 136 output to the audio output interface 162. The audio output interface 162 communicates the audio data signal and the application program's output via the speaker 164.

For the recipient computer 222, the microphone 163 receives the audio data signal and the voice 212 (and any output from the application program 136) and passes the audio data signal and voice to the audio input interface 161. The audio input interface 161 communicates the audio data signal and the voice 212 to a splitter 502. The splitter 502 passes the voice 212 to the API record module 536a. The API record module 536a can record the voice 212 for the application program 136. Alternatively, the API record module 536a can disregard the voice 212.

The splitter 502 passes the audio data signal to a decoder 504. The decoder 504 extracts the event message from the audio data signal 208 and passes the decoded data to the transcoder 506. The transcoder 506 interprets the event message and instructs the application program 136 to perform an action corresponding to the event message according to the application program's 136 configuration.

In the exemplary embodiment illustrated in FIG. 5, the mixer 510 and the splitter 502 are illustrated as separate components. In an alternative exemplary embodiment, the encoder 508 and the decoder 504 can comprise the mixer 510 and the splitter 502, respectively.

Figure 6:
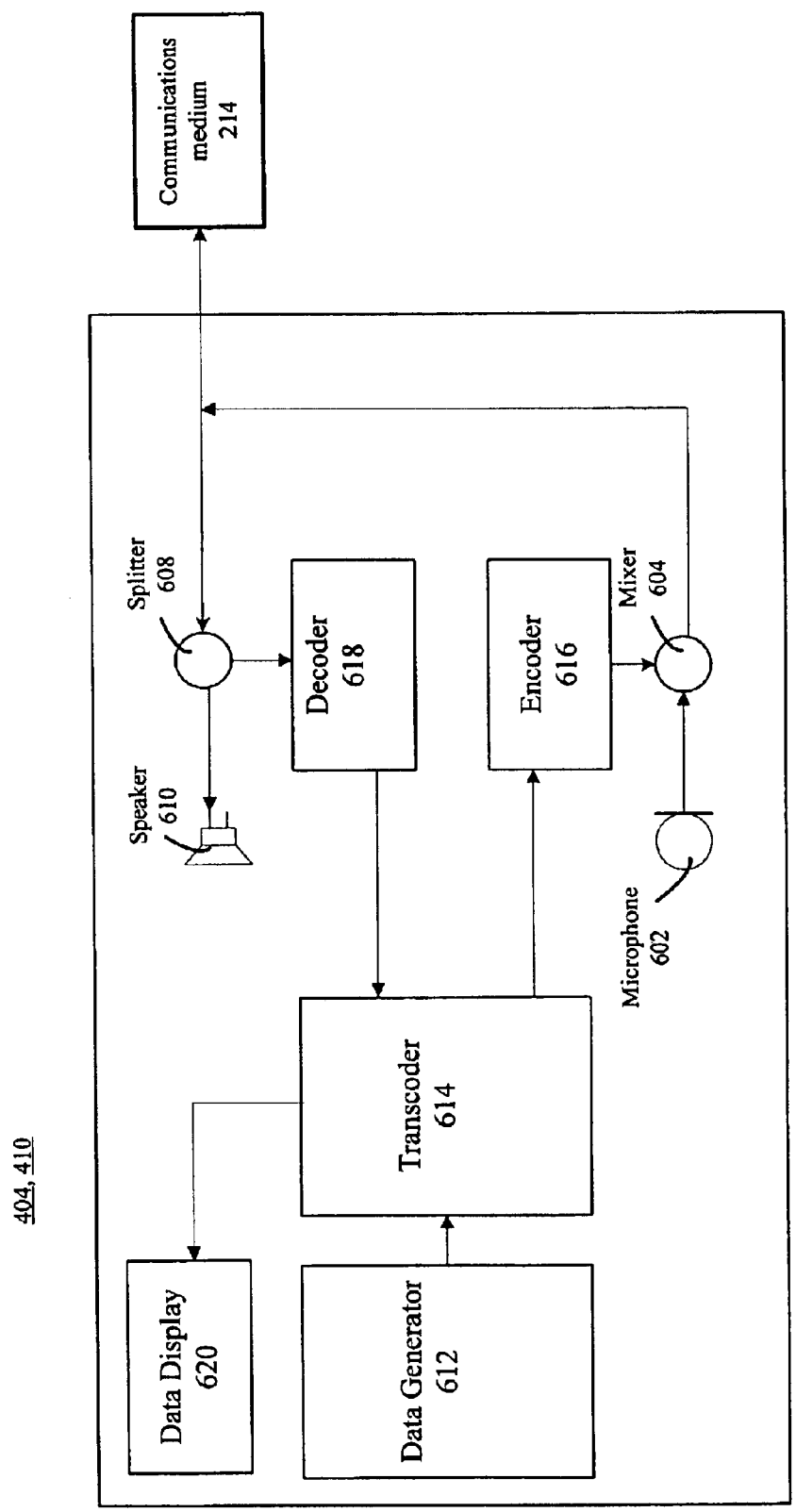
FIG. 6 is a block diagram depicting components of a source communications device and a recipient communications device according to an exemplary embodiment of the present invention.

FIG. 6 is a block diagram depicting components of a source communications device 406 and a recipient communications device 410 according to an exemplary embodiment of the present invention. As a source communications device 406, a data generator 612 performs an action and communicates an event message to the transcoder 614. The transcoder determines whether to notify a recipient computer of the performed action. If not, then the transcoder 614 waits for another event message from the data generator 612. If the transcoder 614 will notify a recipient computer, then the transcoder 614 communicates the event message to an encoder 616. The encoder 616 encodes the event message in an audio data signal and communicates the audio data signal to a mixer 604. The mixer 604 mixes the audio data signal with voice received through a microphone 602. From the mixer 604, the system 600 communicates the combined audio data signal and voice via the communications medium 214.

As a recipient communications device 410, a splitter 608 receives the combined audio data signal and voice via the communications medium 214. The splitter 608 communicates the voice to the location 406 through the speaker 610. The splitter 608 also passes the audio data signal to a decoder 618. The decoder 618 extracts the event message from the audio data signal and communicates the event message to the transcoder 614. The transcoder 614 interprets the event message and instructs a data display 620 to perform an action corresponding to the event message.

Figure 7:
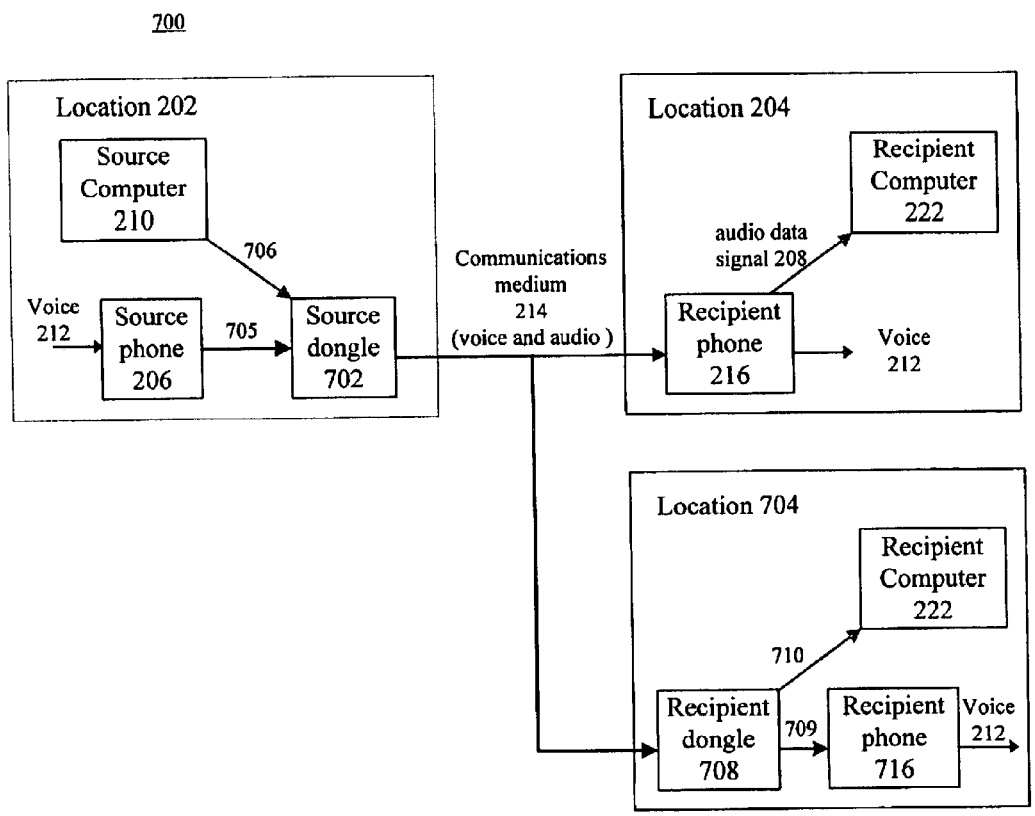
FIG. 7 is a block diagram illustrating a system for communicating audio data signals via a communications medium according to another exemplary embodiment of the present invention.

FIG. 7 is a block diagram illustrating a system 700 for communicating audio data signals via a communications medium according to another exemplary embodiment of the present invention. As illustrated in FIG. 7, the system 700 includes the components described above with reference to FIG. 2. The system 700 also includes a source dongle 702 at location 202. The dongle 702 receives the voice 212 from the source telephone 206 via connection 705. The dongle 702 also receives the event message or the audio data signal 208 from a direct connection 706 with the source computer 210.

If the dongle 702 receives the audio data signal 208 from the source computer 210, then the dongle 702 combines the voice 212 and the audio data signal 208 and communicates the combined audio through the communications medium 214 to the recipient telephone 216 at location 204. If the dongle 702 receives the event message from the source computer 210, then the dongle 702 encodes the event message in an audio data signal 208, combines the voice 212 and the audio data signal 208, and communicates the combined audio through the communications medium 214 to the recipient telephone 216 at location 204. The operation of the components at location 204 is the same as the operations described above for the system 200 of FIG. 2.

As shown in location 704 of FIG. 7, a recipient dongle 708 also can be provided at the recipient location. The dongle 708 communicates the voice 212 to the recipient telephone 716 via connection 709. The dongle 708 also communicates the audio data signal 208 or the event message via connection 710 to the recipient computer 222. In an exemplary embodiment, the dongle 708 communicates the audio data signal 208 to the recipient computer 222 via the connection 710. Then, the recipient computer 222 extracts the event message from the audio data signal 208 and performs an action based on the event message. In an alternative exemplary embodiment, the dongle 708 extracts the event message from the audio data signal 208 and communicates the event message to the recipient computer 222 via the connection 710. Then, the recipient computer 222 performs an action based on the event message.

The dongle 702 communicates the voice 212 and the audio data signal 208 as coherent sound over the communications medium 214. Accordingly, any person can participate in the meeting if he has access to a telephone. The system 700 can communicate simultaneously the voice 212 and the audio data signal 208. The meeting participant hears the voice 212 and the audio data signal 208. If the meeting participant has access to a recipient computer 222, then the meeting participant can enjoy an enhanced meeting through the actions performed by the recipient computer 222 in response to the event message in the audio data signal 208.

Figure 8A:
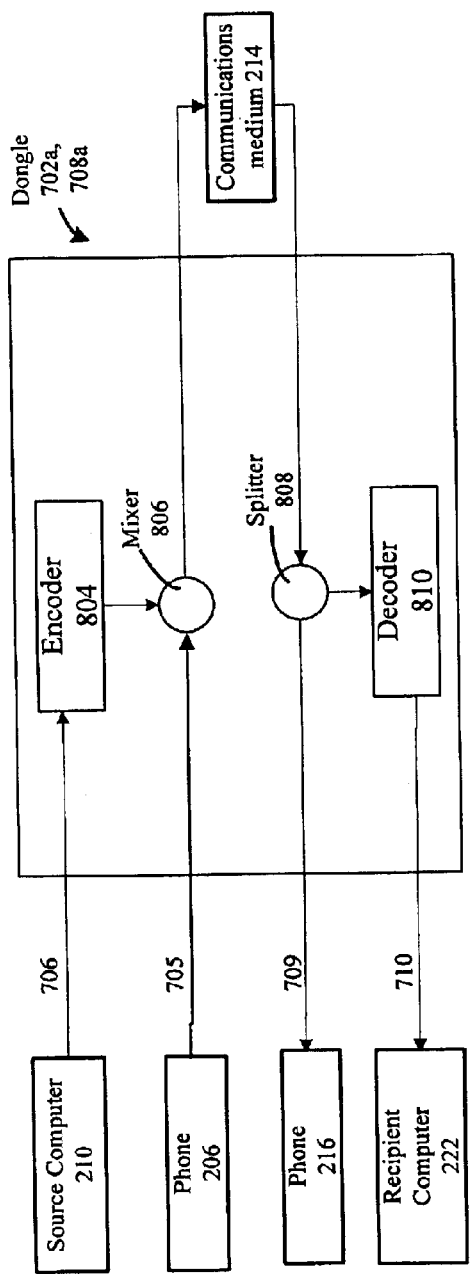
FIG. 8A is a block diagram illustrating components of a dongle according to an exemplary embodiment of the present invention.

FIG. 8A is a block diagram illustrating components of a dongle 702a, 708a according to an exemplary embodiment of the present invention. As shown, a single dongle can comprise both send and receive components. As illustrated in FIG. 8A, the source dongle 702a comprises an encoder 804 that receives the event message from the source computer 210 via connection 706. The encoder 804 encodes the event message in the audio data signal 208 and communicates the audio data signal 208 to a mixer 806. The mixer 806 receives the voice 212 from the source telephone 206 via the connection 705 and the audio data signal 208 from the encoder 804 and communicates the combined voice 212 and audio data signal 208 via the communications medium 214.

A splitter 808 in the recipient dongle 708a receives the voice 212 and the audio data signal via the communications medium 214. The splitter passes the voice 212 to the recipient telephone 216 via connection 709. The splitter 808 also passes the audio data signal 208 to a decoder 810. The decoder 810 extracts the event message from the audio data signal 208 and communicates the event message to the recipient computer 222 via connection 710.

Figure 8B:
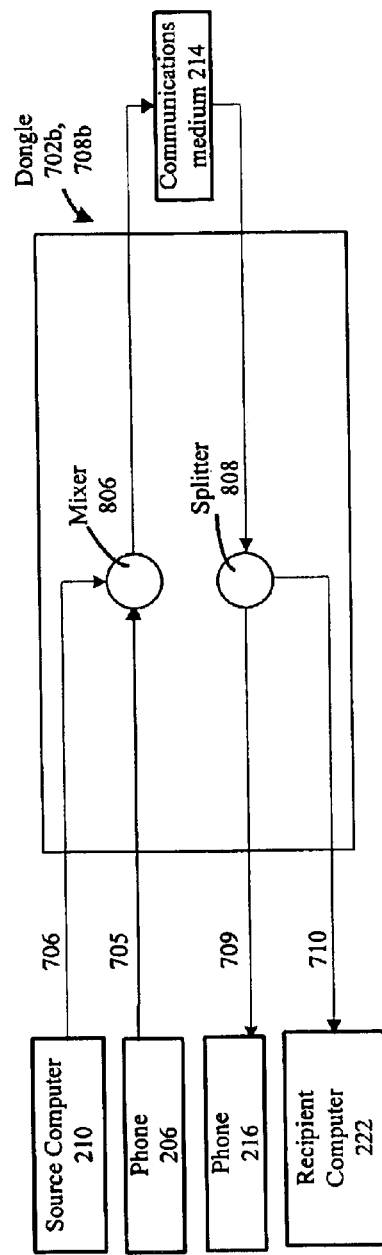
FIG. 8B is a block diagram illustrating components of a dongle according to another exemplary embodiment of the present invention.

FIG. 8B is a block diagram illustrating components of a dongle 702b, 708b according to another exemplary embodiment of the present invention. As shown, a single dongle can comprise both send and receive components. As illustrated in FIG. 8B, the source dongle 702b comprises a mixer 806. The mixer 806 receives the voice 212 from the source telephone 206 via the connection 705 and the audio data signal 208 from an encoder in the source computer 210 via the connection 706 and communicates the combined voice 212 and audio data signal 208 via the communications medium 214.

A splitter 808 in the recipient dongle 708b receives the voice 212 and the audio data signal 208 via the communications medium 214. The splitter passes the voice 212 to the recipient telephone 216 via connection 709. The splitter 808 also passes the audio data signal 208 to a decoder in the recipient computer 222 via connection 710.

As illustrated in FIGS. 8A and 8B, various components of the source and recipient computers 210, 222 can be implemented in a separate hardware or software module executing within the system 700.

Figure 9:
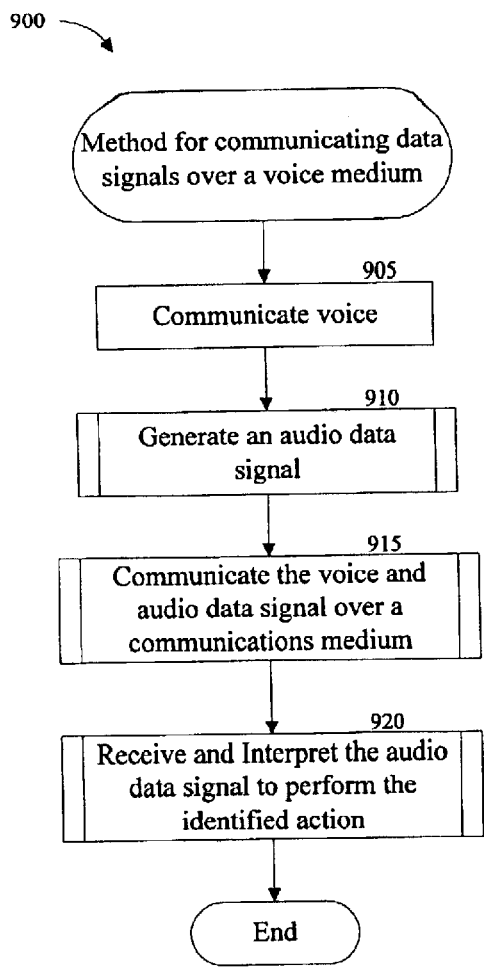
FIG. 9 is a flow chart depicting a method for communicating audio data signals via a communications medium according to an exemplary embodiment of the present invention.

FIG. 9 is a flow chart depicting a method 900 for communicating audio data signals via a communications medium according to an exemplary embodiment of the present invention. In step 905, a meeting participant communicates voice 212 by speaking, playing voice audio, or other suitable means. In step 910, a source computer 210, 406 generates an audio data signal for instructing a recipient computer 222, 410 to perform an action based on an event message in the audio data signal. In step 915, the source telephone 206, source communications device 406, or dongle 702 communicates the voice 212 and audio data signal 208 via the communications medium 214. Then, in step 920, the recipient computer 222, 410 receives and interprets the audio data signal to perform the identified action.

Figure 10:
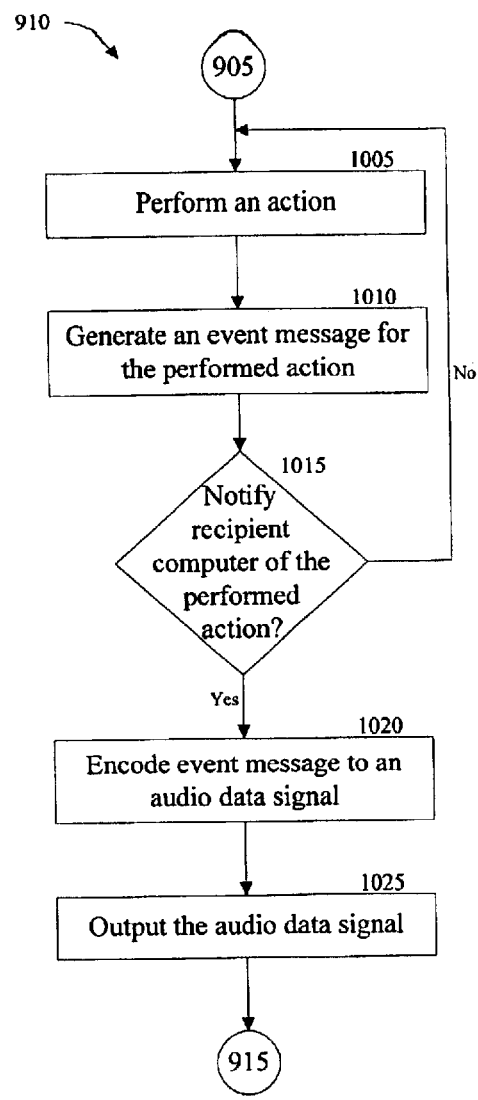
FIG. 10 is a flow chart depicting a method for generating an audio data signal according to an exemplary embodiment of the present invention.

FIG. 10 is a flow chart depicting a method 910 for generating an audio data signal according to an exemplary embodiment of the present invention, as referred to in step 910 of FIG. 9. In step 1005, the application program 136, or data generator 612, performs an action and generates an event message for the performed action in step 1010. In step 1015, the transcoder 506, 614 receives the event message from the application program 136 or data generator 612, and determines whether to notify the recipient computer 222, 410 of the performed action. In an exemplary embodiment, the transcoder 506, 614 determines whether to notify one or more of multiple recipient computers. If not, then the transcoder 506, 614 waits to receive another event message from the application program 136. If yes, then the transcoder 506, 614 communicates the event message to the encoder 508, 616, 804, and the encoder 508, 616, 804 encodes the event message in an audio data signal 208 in step 1020. In step 1025, the encoder 508, 616, 804 outputs the audio data signal 208 to the mixer. The method then proceeds to step 915 (FIG. 9).

Figure 11:
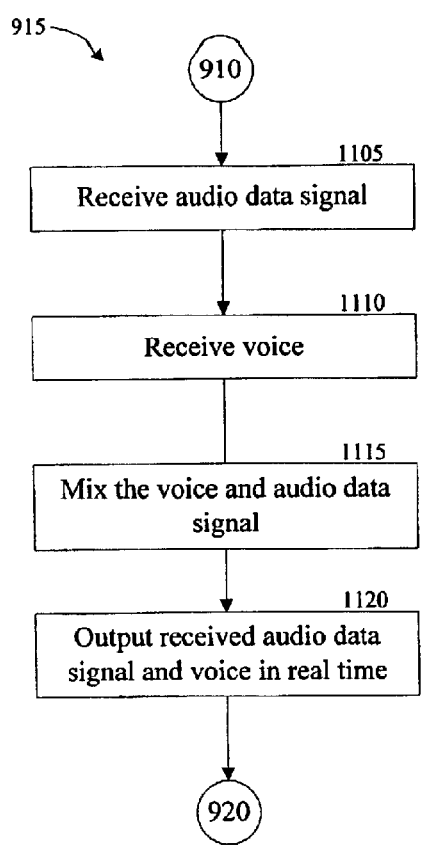
FIG. 11 is a flow chart depicting a method for communicating voice and an audio data signal via a communications medium according to an exemplary embodiment of the present invention.

FIG. 11 is a flow chart depicting a method 915 for communicating the voice 212 and the audio data signal 208 via the communications medium 214 according to an exemplary embodiment of the present invention, as referred to in step 915 of FIG. 9. In steps 1105 and 1110, the mixer receives the audio data signal 208 and the voice 212, respectively. In an exemplary embodiment, the mixer receives the audio data signal and the voice 212 simultaneously. Then, in step 1115, the mixer combines the voice 212 and the audio data signal 208. In step 1120, the mixer outputs the combined audio data signal and voice 212 in real time. The method then proceeds to step 920 (FIG. 9).

In an exemplary embodiment, the mixer comprises a telephone that receives all sounds communicated to its microphone and communicates those sounds via the communications medium 214. In alternative exemplary embodiments, the source communications device or phone dongle can comprise the mixer that communicates the voice 212 and the audio data signal 208 via the communications medium 214.

Figure 12:
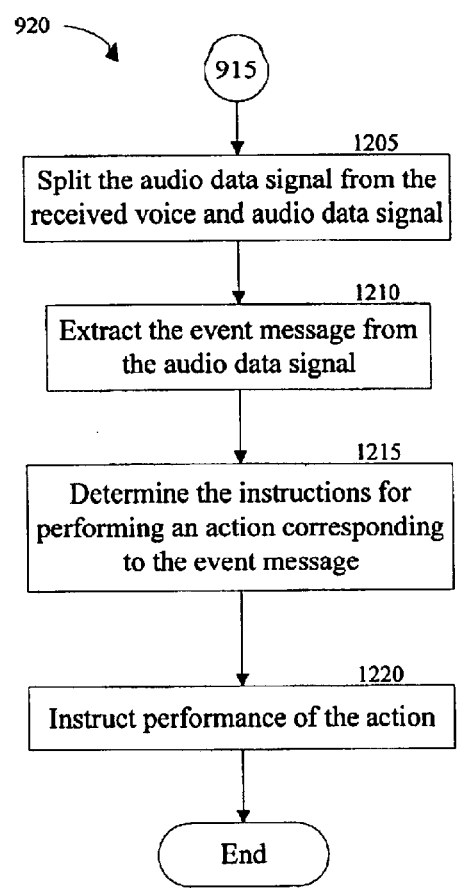
FIG. 12 is a flow chart depicting a method for receiving and interpreting an audio data signal according to an exemplary embodiment of the present invention.

FIG. 12 is a flow chart depicting a method 920 for receiving and interpreting the audio data signal according to an exemplary embodiment of the present invention, as referred to in step 920 of FIG. 9. In step 1205, the splitter of the recipient computer 222, 410, 808 splits the audio data signal 208 from the voice 212 and passes the audio data signal 208 to the decoder 504, 618, 810. In step 1210, the decoder 504, 618, 810 extracts the event message from the audio data signal and communicates the event message to the transcoder 506, 614 of the recipient computer 222, 410. In step 1215, the transcoder 506, 614 determines the instructions for causing the application program 136 or data display 620 to perform an action based on the event message from the audio data signal. Then, in step 1220, the transcoder 506, 614 instructs the application program 136 or data display 620 to perform the action.

The present invention can be used with computer hardware and software that performs the methods and processing functions described above. As will be appreciated by those skilled in the art, the systems, methods, and procedures described herein can be embodied in a programmable computer, computer executable software, hardware, or digital circuitry. The software can be stored on computer readable media. For example, computer readable media can comprise a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A source computing system for communicating audio data signals, comprising:
    a first portion that determines that an event occurring at the source computing system is to be communicated;
    a second portion that communicates an audio data signal for combination with a voice signal to produce coherent sound that is communicated via an audio communications medium, the audio data signal indicative of the event and comprising data generated by the source computing system;
    a telephone that receives the voice signal and communicates the voice signal; and
    a dongle that receives the voice signal communicated from the telephone and the audio data signal communicated from the source computing system, combines the voice signal and the audio data signal to produce the coherent sound, and communicates the coherent sound via the audio communications medium.

2. The system according to claim 1, wherein the audio communications medium comprises air.

3. The system according to claim 1, wherein the audio communications medium comprises a telephone communications system.

4. The system according to claim 1, wherein the source computing system comprises a speaker that communicate the audio data signal.

5. The system according to claim 4, wherein the source computing system further comprises:
- a source application program that generates the data;
- a source transcoder that determines whether to communicate the generated data to a recipient computing system and that forwards the generated data in response to a determination to communicate the generated data to the recipient computing system; and
- an encoder logically coupled to the source transcoder that converts the generated data into the audio data signal and outputs the audio data signal to the speaker.

6. The system according to claim 5, wherein the recipient computing system comprises a microphone that receives the audio data signal.

7. The system according to claim 6, wherein the recipient computing system further comprises:
- a decoder that extracts the generated data from the audio data signal;
- a transcoder logically coupled to the decoder that interprets the data from the audio data signal and issues an instruction to perform an action based on the data from the audio data signal; and
- a recipient application program that performs the action corresponding to the instruction.

8. The system according to claim 1, further comprising:
- a source telephone that receives the audio data signal communicated by the source computing system and the voice signal, combines the audio data signal and the voice signal to produce the coherent sound, and communicates the coherent sound via the audio communications medium.

9. The system according to claim 1, wherein the audio data signal comprises one of a beep, tone, watermark, spectrum modulation, volume change, and white noise.

10. The system according to claim 1, wherein the source computing system comprises a source communications device.

11. The system according to claim 5, wherein the recipient computing system comprises at least one of a camera, video camera, directional microphone array, and telephone.

12. The system according to claim 5, further comprising:
- a recipient dongle that receives the coherent sound communicated via the audio communications medium, separates the voice signal and the audio data signal, and communicates the audio data signal to the recipient computing system.

13. The system according to claim 1, wherein the source computing system comprises at least one of a camera, video camera, directional microphone array, and telephone.

14. A system for communicating audio data signals, comprising:
- a source computing system that communicates generated data in response to performing an action;
- a source telephone that receives a voice signal and communicates the voice signal; and
- a source dongle that receives the voice signal from the source telephone and the generated data from the source computing system, the source computing system having determined to communicate the generated data, converts the generated data into an audio data signal comprising the generated data, combines the voice signal and the audio data signal to produce coherent sound, and communicates the coherent sound via an audio communications medium.

15. The system according to claim 14, wherein the coherent sound is communicated to a recipient computing system comprising a recipient dongle that receives the coherent sound communicated via the audio communications medium, separates the voice signal and the audio data signal, extracts the generated data from the audio data signal, and communicates an instruction to the recipient computer based on the generated data.

16. The system according to claim 14, wherein the audio communications medium comprises air.

17. The system according to claim 14, wherein the audio communications medium comprises a telephone communications system.

18. The system according to claim 14, wherein the audio data signal comprises one of a beep, tone, watermark, spectrum modulation, volume change, and white noise.

19. The system according to claim 14, wherein the dongle comprises:
- an encoder that converts the generated data into the audio data signal; and
- a mixer that combines the audio data signal and the voice signal to produce the coherent sound and that outputs the coherent sound for communication via the audio communications medium.

20. The system according to claim 14, wherein the coherent sound is communicated to a recipient computing system comprising a recipient dongle that receives the coherent sound communicated via the audio communications medium, separates the voice signal and the audio data signal, and communicates the audio data signal to the recipient computer.

21. A recipient computing system for receiving data signals, comprising:
- a first portion that receives an audio data signal from coherent sound, the coherent sound comprising the audio data signal combined with a voice signal and communicated via an audio communications medium, the audio data signal comprising data generated by a source communications device and determined by a source computing system to be communicated to the recipient computing system; and
- a second portion that performs an action based on generated data in the audio data signal.

22. The system according to claim 21, wherein the source communications device comprises at least one of a camera, video camera, directional microphone array, and telephone.

23. The system according to claim 21, wherein the audio communications medium comprises air.

24. The system according to claim 21, wherein the audio communications medium comprises a telephone communications system.

25. The system according to claim 21, wherein the source communications device comprises a telephone.

26. The system according to claim 21, wherein the recipient computing system comprises a microphone that receives the audio data signal.

27. The system according to claim 26, wherein the recipient computing system further comprises:
- a decoder that extracts the generated data from the audio data signal;
- a recipient transcoder logically coupled to the decoder that issues an instruction to perform an action based on the generated data; and a recipient application program that performs the action based on the instruction.

28. The system according to claim 21, wherein the recipient computing system comprises at least one of a camera, video camera, directional microphone array, and telephone.

29. The system according to claim 21, wherein the recipient computing system comprises a recipient communications device.

30. The system according to claim 29, wherein the recipient communications device comprises:
   a decoder that extracts the generated data from the audio data signal;
   a recipient transcoder logically coupled to the decoder that issues an instruction to perform an action based on the generated data; and
   a data display that performs the action corresponding to the instruction.

31. A method for communicating data signals, comprising:
   determining that an event should be communicated to a computing system to cause the computing system to perform an action;
   generating an audio data signal comprising data corresponding to the event;
   combining the audio data signal with a voice signal to produce coherent sound; and
   communicating the coherent sound via an audio communications medium.

32. The method according to claim 31, wherein the generating step comprises:
   performing an action;
   generating the data comprising an event message corresponding to the action; and
   converting the data into the audio data signal.

33. A device for communicating audio data signals, comprising:
   a component that generates data corresponding to an event;
   a transcoder that determines whether to communicate the generated data; and
   an encoder logically coupled to the transcoder that, when the transcoder determines to communicate the generated data, converts the generated data into an audio data signal and that outputs the audio data signal for combination with a voice signal into coherent sound that is communicated via an audio communications medium.

34. The device according to claim 33, further comprising a mixer that combines the audio data signal and the voice signal into the coherent sound.

35. The device according to claim 33, wherein the audio communications medium comprises air.

36. The device according to claim 33, wherein the audio communications medium comprises a telephone communications system.

37. The device according to claim 33, wherein the audio data signal comprises one of a beep, tone, watermark, spectrum modulation, volume change, and white noise.

38. The device according to claim 33, wherein the device comprises at least one of a camera, video camera, directional microphone array, dongle, and telephone.

39. A device for receiving audio data signals, comprising:
   a splitter that receives coherent sound comprising a voice signal and an audio data signal and separates the voice signal and the audio data signal, the audio data signal comprising data corresponding to an event;
   a decoder that receives the audio data signal from the splitter and that extracts the data from the audio data signal; and
   a transcoder logically coupled to the decoder that interprets the data from the audio data signal and issues an instruction that causes a software component to perform an action based on the data from the audio data signal.

40. The device according to claim 39, wherein the audio communications medium comprises air.

41. The device according to claim 39, wherein the audio communications medium comprises a telephone communications system.

42. The device according to claim 39, wherein the audio data signal comprises one of a beep, tone, watermark, spectrum modulation, volume change, and white noise.

43. The device according to claim 39, wherein the device comprises at least one of a camera, video camera, directional microphone array, dongle, and telephone.

44. The device according to claim 39, wherein the software component is a presentation graphics application.

45. The device according to claim 39, wherein the software component is a videoconferencing application.

46. An encoder for communicating audio data signals, comprising:
   a first portion that converts generated data corresponding to an event into an audio data signal, the generated data determined by a transcoder to be communicated; and
   a second portion that outputs the audio data signal for combination with a voice signal to produce coherent sound that is communicated via an audio communications medium.

47. The encoder according to claim 46, wherein the audio data signal comprises one of a beep, tone, watermark, spectrum modulation, volume change, and white noise.

48. The encoder according to claim 46, wherein the encoder comprises at least one of a camera, video camera, directional microphone array, dongle, and telephone.

49. The encoder according to claim 46, further comprising a mixer that combines the audio data signal and the voice signal into the coherent sound.

* * * * *